United States Patent
Fujita et al.

[11] Patent Number: 5,743,669
[45] Date of Patent: Apr. 28, 1998

[54] BALL JOINT

[75] Inventors: Kouichi Fujita, Hamamatsu; Masahiro Yamada, Iwata-gun; Keiichiro Suzuki, Hamana-gun; Masao Takayama, Hamamatsu; Masazumi Suzuki, Iwata-gun, all of Japan

[73] Assignee: Kabushiki Kaisha Somic Ishikawa, Tokyo, Japan

[21] Appl. No.: 937,267

[22] Filed: Sep. 15, 1997

Related U.S. Application Data

[63] Continuation of Ser. No. 646,680, May 10, 1996, abandoned.

[30] Foreign Application Priority Data

May 12, 1995 [JP] Japan ................................. 7-115001

[51] Int. Cl.⁶ .................................................. F16C 11/06
[52] U.S. Cl. ........................ 403/131; 403/282; 403/270; 403/120; 29/898.051
[58] Field of Search ...................... 29/898.051, 898.048, 29/898.043; 403/133, 134, 120, 282, 131, 270

[56] References Cited

U.S. PATENT DOCUMENTS

| | | | |
|---|---|---|---|
| 3,626,566 | 12/1971 | Kilgour | 29/898.051 X |
| 4,256,413 | 3/1981 | Abe | 403/282 |
| 4,380,860 | 4/1983 | Riester | |
| 4,646,887 | 3/1987 | Hirose et al. | 403/282 X |
| 4,954,006 | 9/1990 | Suzuki et al. | 403/133 X |
| 5,044,811 | 9/1991 | Suzuki et al. | 403/133 X |
| 5,335,411 | 8/1994 | Müller et al. | 403/282 X |
| 5,427,467 | 6/1995 | Sugiura | 403/133 X |

FOREIGN PATENT DOCUMENTS

| | | |
|---|---|---|
| 0403107 | 12/1990 | European Pat. Off. . |
| 0478423 | 4/1992 | European Pat. Off. . |
| 0591928 | 4/1994 | European Pat. Off. . |
| 3843331 | 7/1989 | Germany . |
| 9320259 | 5/1994 | Germany . |
| 1121004 | 7/1968 | United Kingdom . |
| WO/9533139 | 12/1995 | WIPO . |

*Primary Examiner*—Anthony Knight
*Attorney, Agent, or Firm*—Morrison Law Firm

[57] ABSTRACT

A ball joint includes a bearing seat crimped in place within a housing. A ball head of a ball stud slides in the bearing seat. A cylindrical crimpable portion of the bearing seat is inserted through a cylindrical portion of the housing. The bearing seat is fixed to the housing with two stopper portions. One of the stopper portions is formed by crimping the cylindrical crimpable portion against one of the ends of the housing. A dust cover is pushed between the ball stud and the other stopper portion. The stopper portion is enlarged outward using ultrasonic vibration. An inner side face of the cylindrical crimpable portion inclines outward at an angle ranging from 3° to 20° with respect to an axial direction of the cylindrical crimpable portion. A chamfered portion and rotation-stop portions, shaped like flower petals, are formed at one end of the housing.

11 Claims, 5 Drawing Sheets

BALL JOINT

This is a continuation of application Ser. No. 08/646,680, filed May 10, 1996, now abandoned.

BACKGROUND OF THE INVENTION

This present invention relates to a ball joint used in an automobile suspension or steering control system.

Japanese Patent Public Disclosure No. 172610/1989 discloses a conventional ball joint for rotatably coupling first and second members. The ball joint includes a ball stud connected to the first member, a housing connected to the second member and a bearing seat disposed between the housing and the ball stud. The ball stud includes a spherical ball head and a stud portion. The stud portion projects from the ball head. The ball stud is fastened to the first member by screws or other fastening means.

The housing includes an essentially cylindrical portion with apertures at top and bottom ends. A spherical face portion of the bearing seat holds the ball head. The ball head is fitted into a space for rotation on the spherical face portion. An outer cylindrical surface of the bearing seat is snugly pushed into the cylindrical portion of the housing.

A stopper step at a first end of the outer cylindrical surface catches an edge of the aperture at the top end of the housing. An essentially cylindrical crimping stopper portion is formed at a second end of the outer cylindrical surface. After the bearing seat is inserted into the inner cylindrical portion of the housing, the crimped stopper portion is enlarged by thermal crimping to engage the aperture at the bottom end of the housing.

With the configuration described above, the ball joint is easily assembled. First, the bearing seat is inserted into the inner cylindrical portion of the housing. The ball head of the ball stud is enveloped in the spherical face portion. The stopper step catches the top end of the housing. Finally, the crimped stopper portion is enlarged by thermal crimping so that the crimped stopper portion catches the bottom end of the housing.

When the second end of the bearing seat is affixed by thermal crimping using an external heat source, temperature control for thermal crimping is difficult. This step complicates the production process.

Another ball joint, disclosed in Japanese Patent Publication No. 11742/1994, is assembled by inserting a raised portion projecting from a bearing seat through a hole in a housing. The raised portion is affixed to the housing by heating the raised portion using a heat source or high frequency induction. Finally, the raised portion is flattened or otherwise deformed.

Considerable energy is required to flatten the raised portion in the process of securing the bearing seat in the housing. Thus, heating the entire bearing seat often hinders smooth rotation of a ball stud and causes other troubles to a boot that covers a portion where the ball stud is fitted in the housing, the surface finish and so forth.

The configuration described above presents problems in that temperature control for thermal crimping is difficult and the production process is complicated. Also, a large amount of energy is necessary to flatten the raised portion to affix the bearing seat in the housing. When the entire bearing seat is heated, the large amount of energy may cause deterioration in the characteristics of the ball joint, including the breaking strength and the sealing capability of the bearing seat. The large amount of energy may also have an unfavorable influence on the surface finishing of the housing, the boot and other parts.

OBJECTS AND SUMMARY OF THE INVENTION

Accordingly, an object of the present invention is to provide a ball joint which overcomes the drawbacks and limitations of the prior art.

Another object of the present invention is to provide a ball joint which is simple and compact.

Another object of the present invention is to provide an easily producible high performance ball joint at a low cost without increasing the number of parts.

Another object of the present invention is to provide a bearing seat that is easily and firmly affixed in a housing.

A still further object of the present invention is to provide a bearing seat with increased breaking strength.

Briefly stated, a ball joint includes a bearing seat crimped in place within a housing. A ball head of a ball stud slides in the bearing seat. A cylindrical crimpable portion of the bearing seat is inserted through a cylindrical portion of the housing. The bearing seat is fixed to the housing with two stopper portions. One of the stopper portions is formed by crimping the cylindrical crimpable portion against one of the ends of the housing. A dust cover is pushed between the ball stud and the other stopper portion. The stopper portion is enlarged outward using ultrasonic vibration. An inner side face of the cylindrical crimpable portion inclines outward at an angle ranging from 3° to 20° with respect to an axial direction of the cylindrical crimpable portion. A chamfered portion and rotation-stop portions, shaped like flower petals, are formed at one end of the housing.

According to an embodiment of the invention, there is provided a subassembly for forming a ball joint, including a housing, the housing having a generally cylindrical portion, a first aperture at a first end of the cylindrical portion, a second aperture at a second end of the cylindrical portion, a ball seat having a generally cylindrical outer surface fitted in the cylindrical portion, the ball seat having a first annular stopper portion at the first end, the ball seat having a cylindrical crimpable portion at the second end, a spherical face portion on an interior of the ball seat, the first stopper portion catching the first aperture, a ball stud fitted into the cylindrical portion, the ball stud having an essentially spherical ball head and a stud portion projecting from the ball head, the spherical face portion rotatably supporting the ball head, the cylindrical crimpable portion having an inner side face, the inner side face being inclined outwardly with respect to an axial direction of the cylindrical crimpable portion, a second annular stopper portion at the second end, and the cylindrical crimpable portion extending a substantial distance beyond the second annular stopper portion, thereby permitting a crimping operation to be performed thereon.

According to an embodiment of the invention, there is provided a method of making a ball joint, including fitting a ball head of a ball stud in a ball seat, rotatably supporting the ball head on a spherical face portion on an interior surface of the ball seat, inserting a generally cylindrical outer surface of the ball seat in a generally cylindrical portion of a housing, catching a first aperture of the housing with a first stopper portion of the ball seat at a first end of the cylindrical portion, crimping an outwardly inclining inner side face of a cylindrical crimpable portion of the ball seat to form a crimped stopper portion, and the crimped stopper portion catching a second aperture of the housing at a second end of the cylindrical portion, whereby the ball seat is retained in the housing.

According to an embodiment of the invention, there is provided a subassembly for forming a ball joint, including a housing having a cylindrical portion, first and second apertures in the housing, a ball stud, the ball stud including a ball head and a stud portion integrally formed therewith, a ball seat disposed in the cylindrical portion, the ball seat enveloping the ball head, with the stud portion protruding from the first aperture, the ball seat permitting the ball head to slide therein, the ball seat having first and second annular stopper portions for respectively contacting the first and second apertures, at least one of the first and second annular stopper portions having a cylindrical crimpable portion, the cylindrical crimpable portion having an inner side face, the inner side face being inclined outward with respect to an axial direction of the cylindrical crimpable portion, and the cylindrical crimpable portion extending a substantial distance beyond the second annular stopper portion, thereby permitting a crimping operation to be performed thereon.

According to an embodiment of the invention, there is provided a subassembly for forming a ball joint, including a housing, an inner chamber in the housing, the inner chamber having apertures at first and second ends, a ball seat disposed in the inner chamber, a ball stud having a ball head and a stud portion, the ball head being disposed in the ball seat with an outer surface thereof in sliding contact with the ball seat, the stud portion projecting from one of the apertures, a cylindrical crimpable portion disposed at a first end of the ball seat, the cylindrical crimpable portion having an inner side face, the inner side face being inclined outward with respect to an axial direction of the cylindrical crimpable portion, a stopper portion disposed at a second end of the ball seat, a dust cover attached to the stud portion and the stopper portion, the stopper portion contacting one of the apertures, and the cylindrical crimpable portion extending a substantial distance beyond an other one of the apertures, thereby permitting a crimping operation to be performed thereon.

According to the above configuration, the bearing seat can easily be affixed in the housing, because at least one of the two stopper portions of the bearing seat is formed by crimping to enlarge a cylindrical crimpable portion. The cylindrical crimpable portion is tube shaped. The cylindrical crimpable portion is inserted into the cylindrical portion of the housing. As the inner side face of the cylindrical crimpable portion is inclined to spread outward with respect to the axial direction of the cylindrical crimpable portion, the cylindrical crimpable portion is smoothly enlarged to form a stopper portion by pressing a jig against the cylindrical crimpable portion.

The ball joint is formed efficiently, because the inner side face of the cylindrical crimpable portion spreads outward at an angle ranging from 3° to 20° with respect to the axial direction of the cylindrical crimpable portion. If the inclination be less than 3°, the cylindrical crimpable portion protrudes inward as well as outward when a jig is pressed against the cylindrical crimpable portion. Therefore, in order to obtain the desired strength, the quantity of resin required to produce the cylindrical crimpable portion exceeds the actual mass of the cylindrical crimpable portion. On the other hand, in cases where the inclination exceeds 20°, the base end of the cylindrical portion is exceedingly thick. This results in a decrease in the breaking strength of the bearing seat and compromises other characteristics.

Since the cylindrical crimpable portion is crimped as it is softened by ultrasonic vibration, temperature control is easier than when an external heating source is used. Thus, the ball joint is also effective in preventing reduction in the supporting ability and other characteristics of the bearing seat.

Since the housing is provided with a chamfered portion around at least one of the two apertures of the cylindrical portion, at the junction of the inner surface and an end face of the cylindrical portion, the corner of the bearing seat caught by the housing is protected. Thus, the ball joint is also effective in increasing the breaking strength of the bearing seat.

Since a plurality of rotation-stop portions are formed around at least one of the two apertures of the cylindrical portion, the ball joint is also effective in preventing the bearing seat from rotating in the housing. Furthermore, since the rotation-stop portions are in the shape of an indentation with a curved surface, the presence of the rotation-stop portions does not decrease the breaking strength of the bearing seat.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
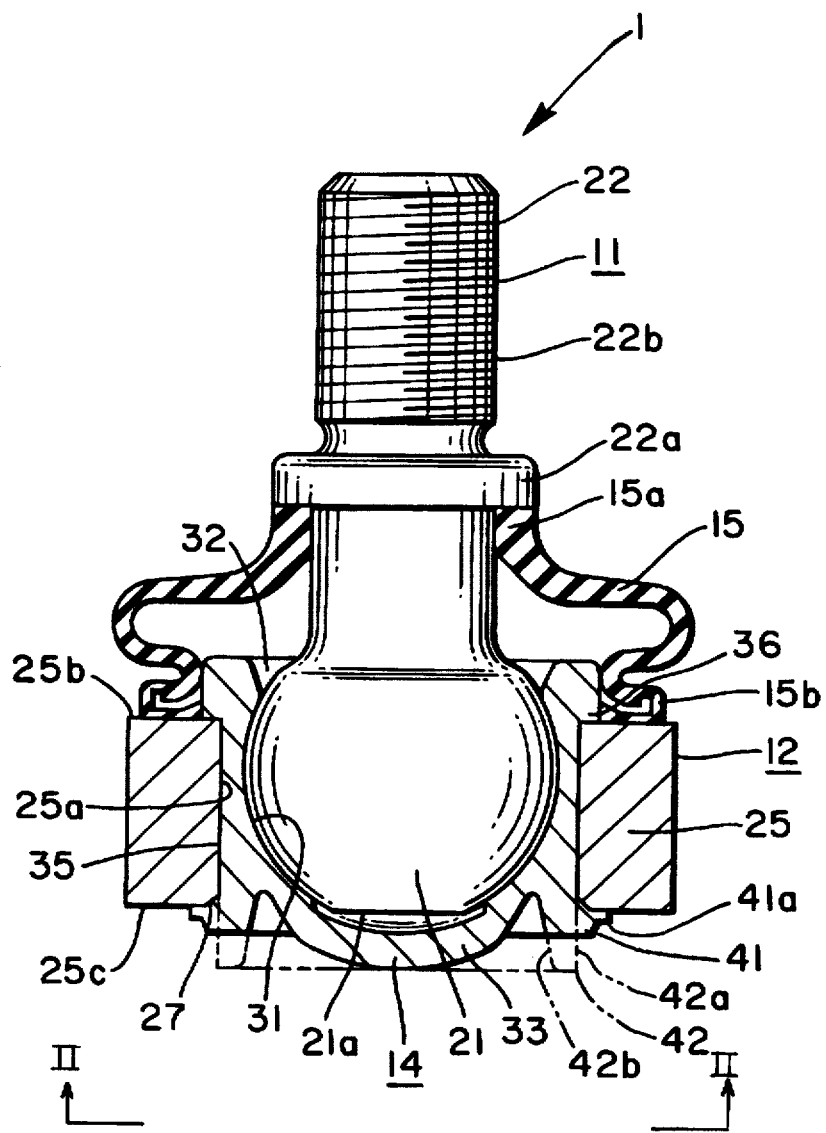
FIG. 1 shows a partial cross section of a ball joint according to an embodiment of the present invention.

Referring to FIG. 1, a ball joint shown generally at 1, includes a housing 12 having an essentially cylindrical portion 25 open at both ends. A bearing seat 14 is inserted into cylindrical portion 25. A ball stud 11 includes an essentially spherical ball head 21. A stud portion 22 of ball stud 11 projects from ball head 21. An outwardly projecting flange portion 22a is formed in the middle of stud portion 22. A threaded portion 22b is formed between flange portion 22a and an end of stud portion 22. Ball head 21 has a flat surface 21a opposing stud portion 22. Ball head 21 is inserted into bearing seat 14. A dust cover 15 fits around stud portion 22 and an end of bearing seat 14.

Figure 2:
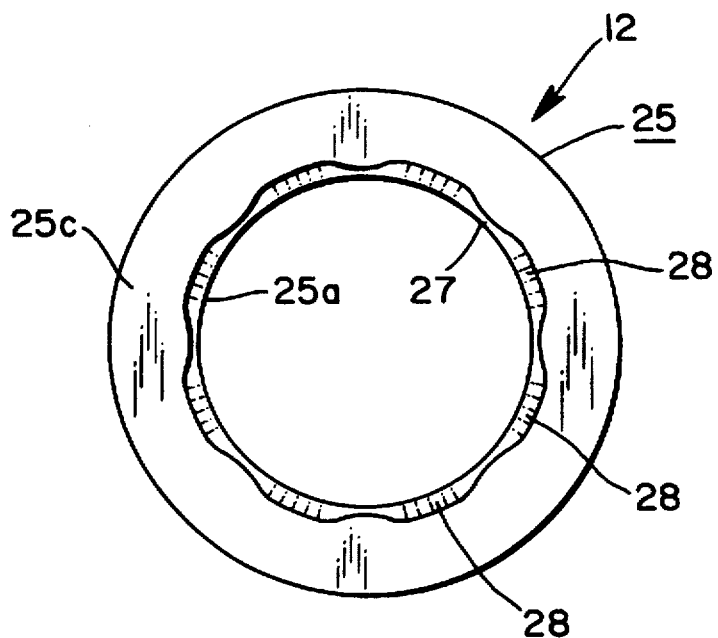
FIG. 2 shows an end view of a housing of the ball joint according to an embodiment of the present invention in the direction of II—II of FIG. 1.

Referring momentarily to FIG. 2, from which bearing seat 14 is omitted for purposes of description, an inclined annular chamfered portion 27 is formed at a junction of an inner surface 25a and an end face 25c of cylindrical portion 25. Annular chamfered portion 27 is inclined with respect to inner surface 25a and end face 25c. A plurality of concave-shaped rotation-stop portions 28 are formed continuously or at regular intervals along the end-face side of chamfered portion 27. Chamfered portion 27 and rotation-stop portions 28 are integrally formed as a smoothly curved surface that looks like flower petals when viewed from an upper end.

Referring again to FIG. 1, bearing seat 14 is formed as an integral body of hard thermoplastic synthetic resin. The synthetic resin is self-lubricating, able to withstand high loads and has a low coefficient of friction. A part of an inner surface of bearing seat 14 is formed into a spherical face portion 31. Spherical face portion 31 is formed as a spherical cylinder. Ball head 21 is slidably fitted into spherical face portion 31. An outward opening aperture 32 is formed at an end of spherical face portion 31. Stud portion 22 projects from aperture 32. An other end of spherical face portion 31 is formed in a cover portion 33 for blocking the open end. Cover portion 33 faces a flat surface 21a of ball head 21.

A part of the outer surface of bearing seat 14 serves as an outer side face 35. Outer side face 35 is a cylindrical surface fitted into cylindrical portion 25. Outer side face 35 is fitted against inner surface 25a. An annular stopper portion 36 is formed at an end of outer side face 35. Annular stopper portion 36 is raised outward to catch an end face 25b of cylindrical portion 25. An annular stopper portion 41 is formed at a second end of outer side face 35. Annular stopper portion 41 catches an end face 25c of cylindrical portion 25. Stopper portion 41 is formed by crimping outward an essentially tubular cylindrical crimpable portion 42, shown in chain line. An annular step 41a is formed at the end of stopper portion 41 to reduce the thickness at the outer edge of annular stopper portion 41.

Figure 3:
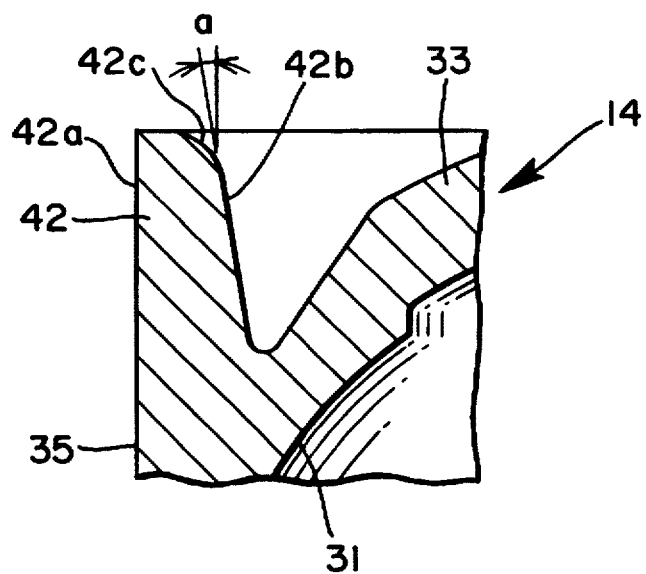
FIG. 3 shows an enlarged partial cross section of a portion of the bearing seat of the ball joint of FIG. 1.

Referring now to FIG. 3, cylindrical crimpable portion 42, before deformation during installation, includes an outer side face 42a that forms a cylindrical surface. Cylindrical outer side face 42a, before installation, is a continuation of the cylindrical shape of outer side face 35. An inner side face 42b of cylindrical crimpable portion 42 forms an inclined surface. Inner side face 42b is angled outward toward the end of cylindrical crimpable portion 42. An angle a of inner side face 42b is formed with respect to an axial direction of outer side face 35. Angle a is in the range between 3° and 20°, and, more preferably between 3° and 10°. An end portion 42c at an end of inner side face 42b is chamfered into a curved surface with a curvature radius (R) of any convenient radius but, in the preferred embodiment, radius R is about 1 mm.

Referring back to FIG. 1, dust cover 15 is made of elastic material such as rubber. Dust cover 15 is formed into a bell-like shape. A fitting portion 15a is fitted around an outer surface of stud portion 22. A fitting portion 15b is fitted around an outer surface of stopper portion 36 at the end of bearing seat 14. In the assembled state, dust cover 15 is held between flange portion 22a and end face 25b, thereby covering aperture 32.

Ball joint 1, having the configuration as described above, rotatably joins parts used in the suspension system of an automobile including, but not limited to a stabilizer, a lower suspension arm and an absorber (not shown). Stud portion 22 and housing 12 are respectively assembled with these parts.

Figure 4:
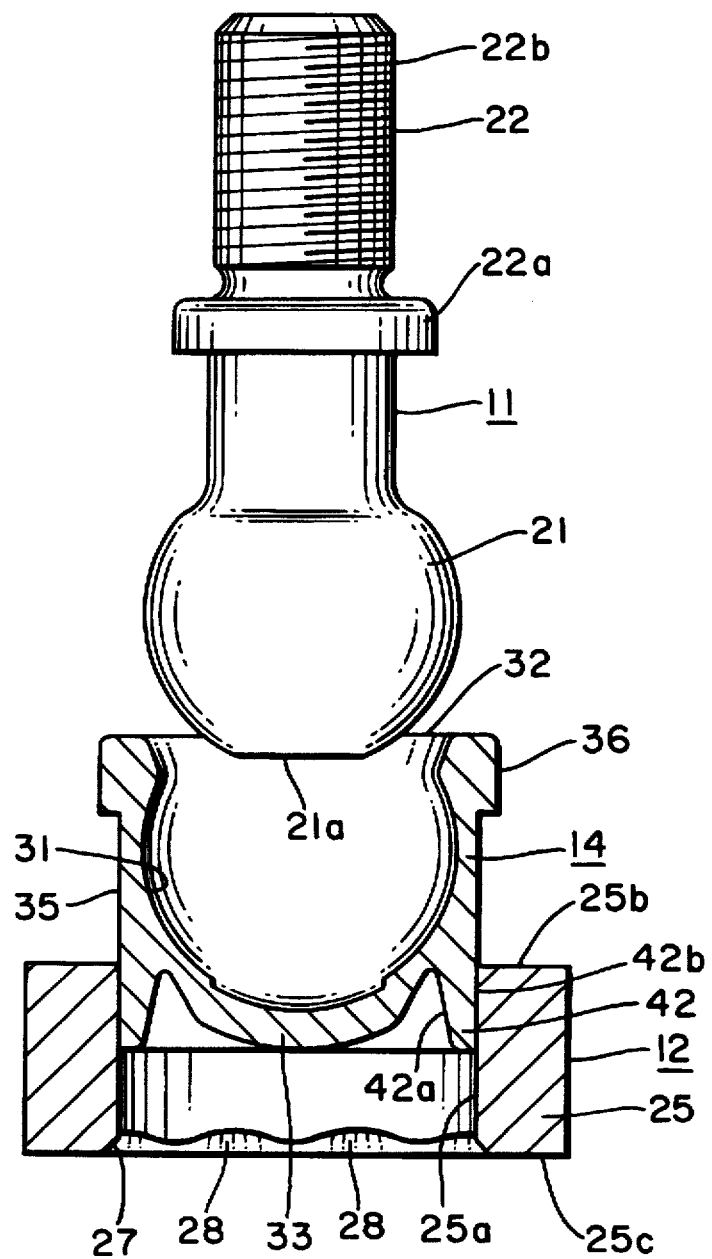
FIG. 4 shows a state in the assembly process of the ball joint.

Referring to FIG. 4, ball joint 1 is assembled by pushing ball stud 11 into bearing seat 14, until ball head 21 contacts spherical face portion 31. Cylindrical crimpable portion 42 of bearing seat 14, uncrimped at this time, is inserted into cylindrical portion 25.

Figure 5:
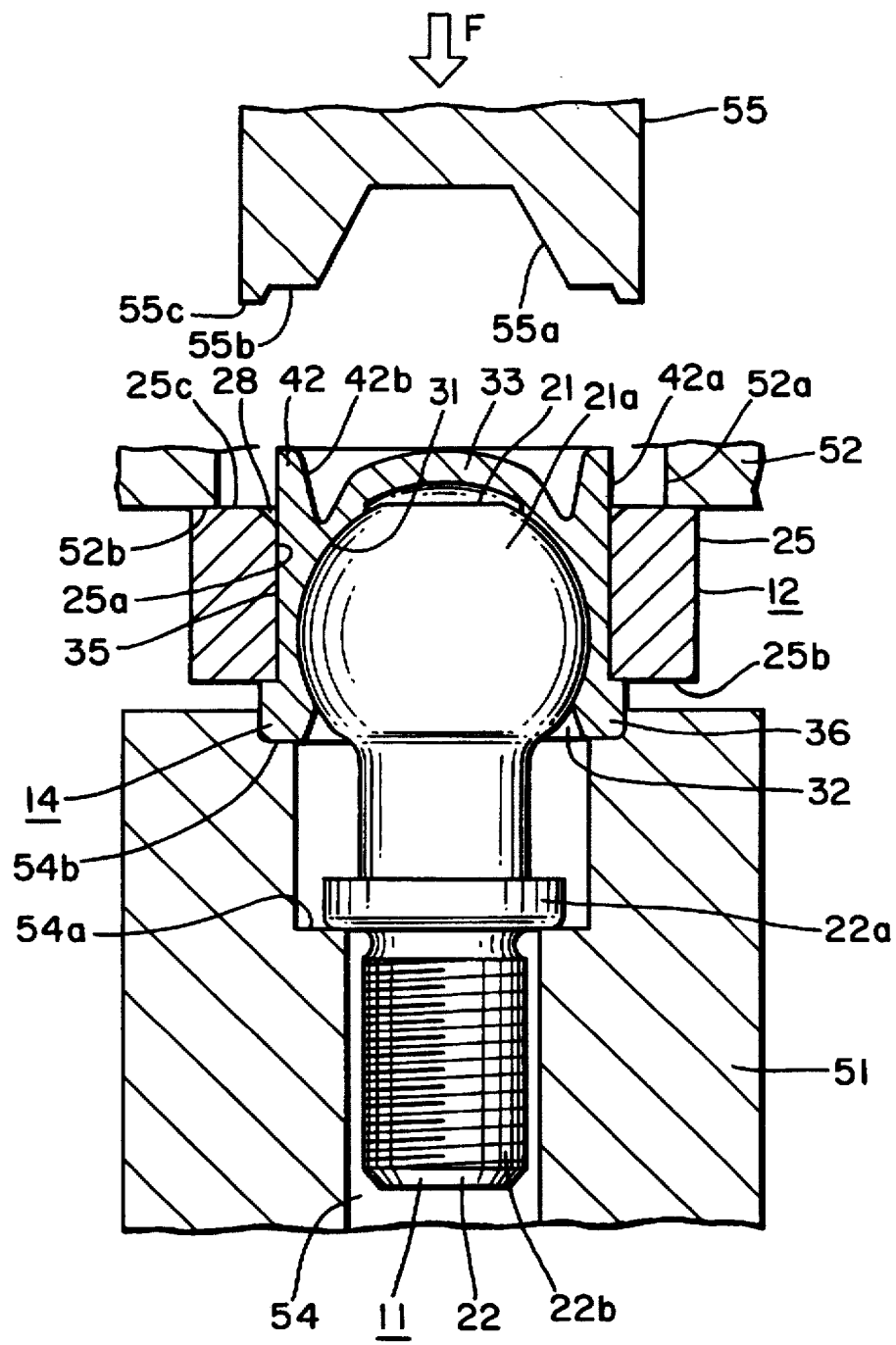
FIG. 5 shows a further state in the assembly process of the ball joint.

Referring to FIG. 5, bearing seat 14 is then pushed further into housing 12, until stopper portion 36 contacts end face 25b. The above assembly of ball stud 11, housing 12 and bearing seat 14 is mounted on a head 51 and secured by an affixing head 52. Affixing head 52 faces head 51. Head 51 contains a through hole 54. Stud portion 22 is inserted into through hole 54. Through hole 54 contains a first step 54a and a second step 54b. First step 54a contacts flange portion 22a. Second step 54b is formed above first step 54a, near an aperture of through hole 54. Second step 54b contacts stopper portion 36.

Affixing head 52 includes an aperture 52a. Aperture 52a permits bearing seat 14 to be inserted therethrough. A portion of affixing head 52 around aperture 52a contacts an outer edge of end face 25c. With the configuration as described above, the assembly of ball stud 11, housing 12 and bearing seat 14 is sandwiched between head 51 and affixing head 52. The assembly of ball stud 11, housing 12 and bearing seat 14 is affixed by moving affixing head 52 towards head 51.

Cylindrical crimpable portion 42 is crimped by pressing a press head 55 against cylindrical crimpable portion 42, thereby forming stopper portion 41. Press head 55 includes an indented portion 55a. Indented portion 55a is in the shape of a truncated cone. Indented portion 55a prevents contact with cover portion 33. A crimping surface 55b is formed around indented portion 55a. Crimping surface 55b contacts cylindrical crimpable portion 42. A raised portion 55c is formed around an outer edge of crimping surface 55b. Further, an ultrasonic generating device (not shown) vibrates press head 55 to generate heat for deformation of cylindrical crimpable portion 42.

While crimping surface 55b is pressed against cylindrical crimpable portion 42, cylindrical crimpable portion 42 is softened by ultrasonic vibration as pressure is applied in the direction represented by an arrow F. The pressure of press head 55 enlarges cylindrical crimpable portion 42 outward, thereby forming stopper portion 41. Stopper portion 41 snugly contacts and is stopped by end face 25c and rotation-stop portion 28. When stopper portion 41 is formed, a step 41a is formed around an outer surface by raised portion 55c.

Figure 6:
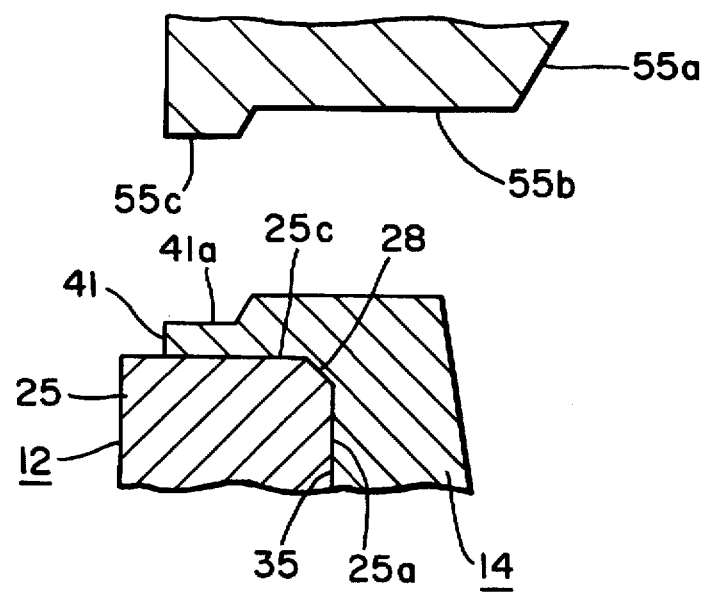
FIG. 6 shows a close up view of the ball joint of FIG. 1 in a final state in the assembly process.

Referring to FIG. 6, a close up of view of one side of the assembly of bearing seat 14 and housing 12 is shown following assembly. Press head 55 is raised out of contact with bearing seat 14. The assembly of ball stud 11, housing 12 and bearing seat 14 is then removed from head 51.

Referring to FIG. 5, to repeat the steps of assembly, cylindrical crimpable portion 42 is inserted through cylindrical portion 25. Stopper portion 41 is formed at an end of bearing seat 14 by crimping cylindrical crimpable portion 42. Crimping enlarges cylindrical crimpable portion 42. Thus, bearing seat 14 can be easily affixed in housing 12. Furthermore, inner side face 42b is inclined to spread outward with respect to an axial direction of cylindrical crimpable portion 42. Thus, cylindrical crimpable portion 42 is smoothly enlarged by pressing press head 55 against cylindrical crimpable portion 42. Press head 55 has a simple form. As stopper portion 41 is easily formed in the manner described above, the production cost of ball joints is reduced.

By forming inner side face 42b to spread outward at an angle ranging from 3° to 20° or, more preferably from 3° to 10° with respect to an axial direction of cylindrical crimpable portion 42, production costs are reduced. Also, satisfactory performance of bearing seat 14 is ensured, including breaking strength and sealing capability. If angle a is less than 3°, there is a danger of cylindrical crimpable portion 42 inclining not only outward, but also inward when press head 55 is pressed against cylindrical crimpable portion 42. As a result, in order to obtain the desired strength, it is necessary to use more resin to produce cylindrical crimpable portion 42 than the actual mass of cylindrical crimpable portion 42, thereby increasing production costs.

On the other hand, in cases where angle a exceeds 20°, a base end of cylindrical crimpable portion 42 is too thick for efficient deformation. Thus, a very large amount of energy is necessary for ultrasonic vibration or other treatment to melt and crimp cylindrical crimpable portion 42. The excessive ultrasonic vibration affects a portion of bearing seat 14 adjacent to cylindrical crimpable portion 42. Cover portion 33 tends to crack, resulting in reduction of the characteristics of the bearing seat, including breaking strength and sealing capability.

Since cylindrical crimpable portion 42 is softened by ultrasonic vibration to enable crimping, there is no need for the temperature control when heating with an external heating source as in the prior art. Therefore, the supporting ability and other characteristics of bearing seat 14 are retained.

Referring to FIGS. 2 and 5, since housing 12 has chamfered portions 27 around one of the two apertures of cylindrical portion 25, at a junction of inner side face 25a and end face 25c, a corner of stopper portion 41, where bearing seat 14 is caught by housing 12, is protected. Thus, the breaking strength of bearing seat 14 is increased. Experiments conducted on this feature have proven that the breaking strength of bearing seat 14 with chamfered portion 27 described as above is 1.3 times higher than that of a commonly available bearing seat without a chamfered portion.

Referring to FIG. 2, a plurality of concave-shaped rotation-stop portions 28 are formed continuously or at regular intervals along the end-face side of chamfered portion 27. Chamfered portion 27 and rotation-stop portions 28 are integrally formed as a smoothly curved surface that looks like flower petals when viewed from the upper end. Therefore, bearing seat 14 is prevented from rotating in housing 12 without reducing the breaking strength of bearing seat 14. Experiments conducted on this feature have proven that the rotation-stopping effect is 3.5 times higher than that of a commonly available bearing seat without rotation-stop portion 28.

Referring to FIG. 3, by forming a curve or a chamfer with a curvature radius (R) of approximately 1mm at end portion 42c, cylindrical crimpable portion 42 is smoothly deformed outward and easily brought into close contact with end face 25c when press head 55 is pressed against cylindrical crimpable portion 42.

Referring to FIG. 5, a raised portion 55c is formed around the outer edge of crimping surface 55b of press head 55. Press head 55 forms stopper portion 41 by crimping cylindrical crimpable portion 42. Step 41a is formed around the outer surface of stopper portion 41. Therefore, the degree of contact and sealing capability between the end of housing 12 and the end of bearing seat 14 is increased.

Referring to FIG. 1, according to the embodiment described above, dust cover 15 is attached to stud portion 22 and stopper portion 36 by being pushed therebetween. However, it is also possible to form an annular raised portion around the outer surface of stopper portion 36, thereby forming a recess between this ridge and end face 25b. An annular groove is formed in dust cover 15. In this configuration, the portion of dust cover 15 where the groove is formed is fitted in the recess between the raised portion and end face 25b. Dust cover 15 is affixed by clips.

Referring to FIG. 5, bearing seat 14 is easily affixed in housing 12 because at least one of the two stopper portions of bearing seat 14 is formed by crimping to enlarge cylindrical crimpable portion 42. Cylindrical crimpable portion 42 is tube shaped with an outwardly inclined inner surface. Cylindrical crimpable portion 42 is inserted into cylindrical portion 25. As inner side face 42b is inclined to spread outward with respect to the axial direction of cylindrical crimpable portion 42, cylindrical crimpable portion 42 is smoothly enlarged to form stopper portion 41 by pressing press head 55 against cylindrical crimpable portion 42. Thus, the cost of production is reduced.

Inner side face 42b is inclined outward at an angle a ranging from 3° to 20° with respect to the axial direction of the cylindrical crimpable portion 42. Therefore, production costs are reduced because it is not necessary to use more resin to produce cylindrical crimpable portion 42 than the actual mass of the cylindrical crimpable portion 42. Furthermore, as the base end of the cylindrical crimpable portion is limited to the minimum necessary thickness, influence of the crimping action on the portion of bearing seat 14 adjacent to cylindrical crimpable portion 42 is minimal. Thus, performance characteristics of bearing seat 14, such as the breaking strength, is ensured.

As cylindrical crimpable portion 42 is softened by ultrasonic vibration and crimped, temperature control is easier than in the case of using an external heating source as in the prior art. Therefore, a reduction in supporting ability and other characteristics of bearing seat 14 is prevented.

Since housing 12 includes chamfered portion 27 around at least one of the two apertures of cylindrical portion 25, at the junction of inner surface 25a and end face 25c, the corner of bearing seat 14 caught by housing 12 is protected. Thus, the breaking strength of bearing seat 14 is increased.

The plurality of rotation-stop portions 28 are formed around at least one of the two apertures of cylindrical portion 25. Each of the rotation-stop portions 28 is in the shape of an indentation with a curved surface. Thus, bearing seat 14 is prevented from rotating in housing 12 without reducing its breaking strength.

Having described preferred embodiments of the present invention with reference to the accompanying drawings, it is to be understood that the present invention is not limited to the precise embodiments, and that various changes and modifications may be effected therein by one skilled in the art without departing from the scope or spirit of the present invention which is limited only by the appended claims.

What is claimed is:

1. A ball joint, comprising:

a housing;

said housing having a generally cylindrical portion;

a first aperture at a first end of said cylindrical portion;

a second aperture at a second end of said cylindrical portion;

a ball seat having a generally cylindrical outer surface fitted in said cylindrical portion;

said ball seat having a first annular stopper portion at said first end;

said ball seat having a cylindrical crimpable portion at said second end;

a spherical face portion on an interior of said ball seat;

said first stopper portion catching said first aperture;

a ball stud fitted into said cylindrical portion;

said ball stud having an essentially spherical ball head and a stud portion projecting from said ball head;

said spherical face portion rotatably supporting said ball head;

said cylindrical crimpable portion having an inner side face;

said inner face being inclined outwardly with respect to an axial direction of said cylindrical crimpable portion;

a second annular stopper portion at said second end;

said cylindrical crimpable portion extending a substantial distance beyond said second annular stopper portion, thereby permitting a crimping operation to be performed thereon;

said housing including a chamfered portion around at least one of said first and second apertures; and said chamfered portion being formed at a junction of an inner surface and an end face of said cylindrical portion.

2. A subassembly for forming a ball joint according to claim 1, wherein said inner side face is inclined outward at an angle ranging from about 3° to about 20° with respect to an axial direction of said cylindrical crimpable portion.

3. A ball joint according to claim 1, wherein a plurality of rotation-stop surfaces, each of which is shaped as an indentation with a curved surface, are formed around at least one of said first and second apertures.

4. A method of making a ball joint, comprising:

fitting a ball head of a ball stud in a ball seat;

rotatably supporting said ball head on a spherical face portion on an interior surface of said ball seat;

inserting a generally cylindrical outer surface of said ball seat in a generally cylindrical portion of a housing;

catching a first aperture of said housing with a first stopper portion of said ball seat at a first end of said cylindrical portion;

crimping an outwardly inclining inner side face of a cylindrical crimpable portion of said ball seat to form a crimped stopper portion;

said crimped stopper portion catching a second aperture of said housing at a second end of said cylindrical portion, whereby said ball seat is retained in said housing; and forming a chamfered portion around said second aperture, at a junction of an inner surface and an end face of said cylindrical portion.

5. A method of making a ball joint according to claim 4, further comprising inclining said inner side face outward at an angle ranging from about 3° to about 20° with respect to an axial direction of said cylindrical crimpable portion.

6. A method of making a ball joint according to claim 5, further comprising softening said cylindrical crimpable portion by ultrasonic vibration before the step of crimping.

7. A method of making a ball joint according to claim 4, further comprising forming a plurality of rotation-stop portions in said cylindrical portion of said housing adjacent said second aperture, each of which is shaped as an indentation with a curved surface, around at least said second aperture.

8. A subassembly for forming a ball joint, comprising:

a housing having a cylindrical portion;

first and second apertures in said housing;

a ball stud;

said ball stud including a ball head and a stud portion integrally formed therewith;

a ball seat disposed in said cylindrical portion;

said ball seat enveloping said ball head, with said stud portion protruding from said first aperture;

said ball seat permitting said ball head to slide therein;

said ball seat having first and second annular stopper portions for respectively contacting said first and second apertures;

said housing including a chamfered portion around said second aperture:

said chamfered portion being formed at a junction of an inner surface and an end face of said cylindrical portion;

at least one of said first and second annular stopper portions having a cylindrical crimpable portion;

said cylindrical crimpable portion having an inner side face;

said inner side face being inclined outward with respect to an axial direction of said cylindrical crimpable portion; and said cylindrical crimpable portion extending a substantial distance beyond said second annular stopper portion, thereby permitting a crimping operation to be performed thereon.

9. A subassembly for forming a ball joint according to claim 8, wherein said inner side face is inclined outward at an angle ranging from about 3° to about 20° with respect to an axial direction of said cylindrical crimpable portion.

10. A subassembly for forming a ball joint according to claim 8, wherein a plurality of rotation-stop portions, each of which is shaped as an indentation with a curved surface, are formed around at least one of said first and second apertures.

11. A subassembly for forming a ball joint, comprising:

a housing;

an inner chamber in said housing;

said inner chamber having first and second apertures;

said first aperture being at a first end of said inner chamber;

said second aperture being at a second end of said chamber;

a ball seat disposed in said inner chamber;

a ball stud having a ball head and a stud portion;

said ball head being disposed in said ball seat with an outer surface thereof in sliding contact with said ball seat;

said stud portion projecting from said first aperture;

a cylindrical crimpable portion disposed at a first end of said ball seat;

said cylindrical crimpable portion having an inner side face;

said inner side face being inclined outward with respect to an axial direction of said cylindrical crimpable portion;

a stopper portion disposed at a second end of said ball seat;

a dust cover attached to said stud portion and said stopper portion;

said stopper portion contacting said first aperture;

said cylindrical crimpable portion extending a substantial distance beyond said second aperture, thereby permitting a crimping operation to be performed thereon;

said housing including a chamfered portion around said second aperture;

said chamfered portion being formed at a junction of an inner surface and an end face of said cylindrical portion; and a plurality of rotation-stop portions each being shaped as an indentation having a curved surface formed around at least one of said first and second apertures.

* * * * *